US011882358B2

(12) United States Patent
Honjo

(10) Patent No.: US 11,882,358 B2
(45) Date of Patent: Jan. 23, 2024

(54) CONTROL APPARATUS AND CONTROL METHOD PERFORMED THEREBY

(71) Applicant: CANON KABUSHIKI KAISHA, Tokyo (JP)

(72) Inventor: Wataru Honjo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 17/684,506

(22) Filed: Mar. 2, 2022

(65) Prior Publication Data
US 2022/0286596 A1 Sep. 8, 2022

(30) Foreign Application Priority Data
Mar. 3, 2021 (JP) .................................. 2021-033728

(51) Int. Cl.
*H04N 23/661* (2023.01)
*H04N 23/60* (2023.01)

(52) U.S. Cl.
CPC ........... *H04N 23/661* (2023.01); *H04N 23/64* (2023.01)

(58) Field of Classification Search
CPC ...... H04N 23/661; H04N 23/64; H04N 23/69; H04N 23/695; H04N 23/90; H04N 5/268
See application file for complete search history.

(56) References Cited

U.S. PATENT DOCUMENTS

| 6,972,796 | B2 | 12/2005 | Katta et al. |
| 2001/0019363 | A1 | 9/2001 | Katta et al. |
| 2015/0350290 | A1* | 12/2015 | Yang ........................ H04N 7/15 348/14.02 |

FOREIGN PATENT DOCUMENTS

JP  2001-320616 A  11/2001

OTHER PUBLICATIONS

ONVIF, ONVIF Media2 Service Specification, Version 20.12, Dec. 2020, pp. 1-38.

* cited by examiner

*Primary Examiner* — Yogesh K Aggarwal
(74) *Attorney, Agent, or Firm* — Venable LLP

(57) ABSTRACT

A control apparatus comprises: a storage unit configured to store a plurality of profiles corresponding to a distribution setting for each of a plurality of image capturing units; a generation unit configured to integrate the plurality of profiles and generate a virtual profile; and a distribution unit configured to distribute a plurality of videos as a single stream, based on the virtual profile, the plurality of videos being obtained from the plurality of image capturing units. When the virtual profile becomes an invalid configuration during distribution by the distribution unit, the generation unit updates the virtual profile to a valid configuration while maintaining an encoding setting included in the plurality of profiles, and the distribution unit continues the distribution of the stream based on the virtual profile updated.

12 Claims, 8 Drawing Sheets

CONTROL APPARATUS AND CONTROL METHOD PERFORMED THEREBY

BACKGROUND OF THE INVENTION

Field of the Invention

The present invention relates to a technique for composing a plurality of videos for distribution.

Description of the Related Art

A monitoring camera including a plurality of image capturing units is provided with a function of composing videos obtained from the plurality of image capturing units into a single video stream for distribution. Japanese Patent Laid-Open No. 2001-320616 discloses a technique for changing a setting to achieve uniform image quality when a plurality of videos are composed and displayed.

One common standard related to connection between a camera and a client device for receiving a video is Open Network Video Interface Forum (ONVIF). "ONVIF Media2 Service Specification Version 20.12" (December 2020) issued by ONVIF describes a function called virtual profile that enables distribution of videos from a plurality of image capturing units as a single stream. The virtual profile is made by putting profiles (video setting and encoding setting) of individual image capturing units together as a single virtual setting value group.

In a case where the setting for each image capturing unit is changed or the video setting is deleted or the like, a video stream generated based on videos from a plurality of image capturing units may be in an invalid state due to a setting value mismatch or the like. At this time, it is conceivable to reconfigure the virtual profile based on the configuration and setting of the image capturing unit after the change to make the video stream valid again. However, if the setting after the reconfiguration differs from the setting before the reconfiguration, the client device receiving the video stream can sometimes fail to decode/display the video stream.

SUMMARY OF THE INVENTION

According to one aspect of the present invention, a control apparatus comprises: a storage unit configured to store a plurality of profiles corresponding to a distribution setting for each of a plurality of image capturing units; a generation unit configured to integrate the plurality of profiles and generate a virtual profile; and a distribution unit configured to distribute a plurality of videos as a single stream, based on the virtual profile, the plurality of videos being obtained from the plurality of image capturing units, wherein when the virtual profile becomes an invalid configuration during distribution by the distribution unit, the generation unit updates the virtual profile to a valid configuration while maintaining an encoding setting included in the plurality of profiles, and the distribution unit continues the distribution of the stream based on the virtual profile updated.

The present invention enables more preferable stream distribution.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinafter, embodiments will be described in detail by referring to the accompanying drawings. The following embodiments do not limit the invention according to the claims. Although a plurality of features is described in the embodiments, some of the plurality of features may not be essential to the invention, and the plurality of features may be arbitrarily combined. Further, in the accompanying drawings, identical or similar components are denoted by identical reference signs, and redundant description will be omitted.

First Embodiment

A first embodiment of a control apparatus according to the present invention will be described below, with an example of distribution control in a camera that includes a plurality of image capturing units and distributes a video to a client device that is a terminal.

Configuration of Each System Device

Figure 1:
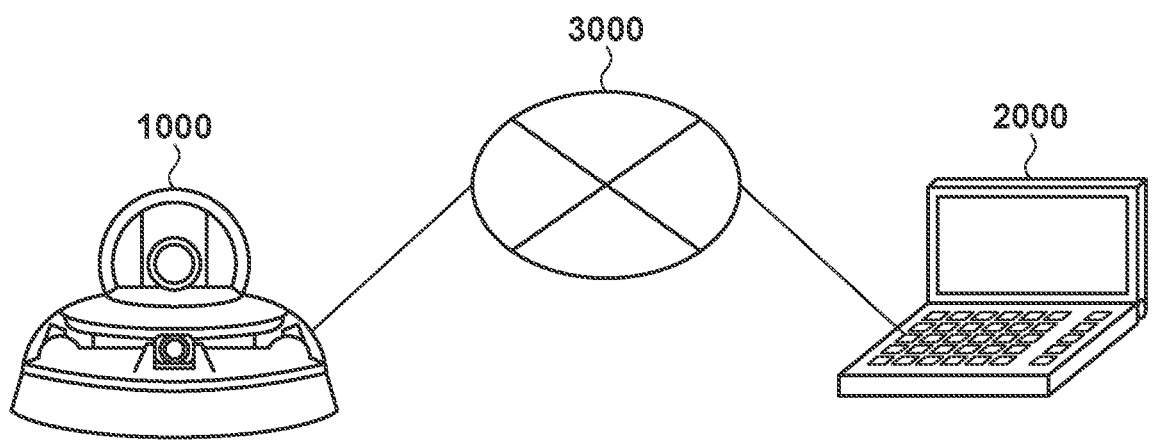
FIG. 1 is a diagram illustrating a system configuration of a first embodiment.

FIG. 1 is a diagram illustrating a system configuration of the first embodiment. The system includes a camera 1000 and a client device 2000 communicatively connected to each other over a network 3000. The camera 1000 includes a plurality of image capturing units (image capturing mechanisms). The client device 2000 transmits, to the camera 1000, a command requesting for a change in video setting and encoding information related to each image capturing mechanism, and a command requesting for video distribution. The camera 1000 processes the received command, and transmits a response to the client device 2000.

Figure 2:
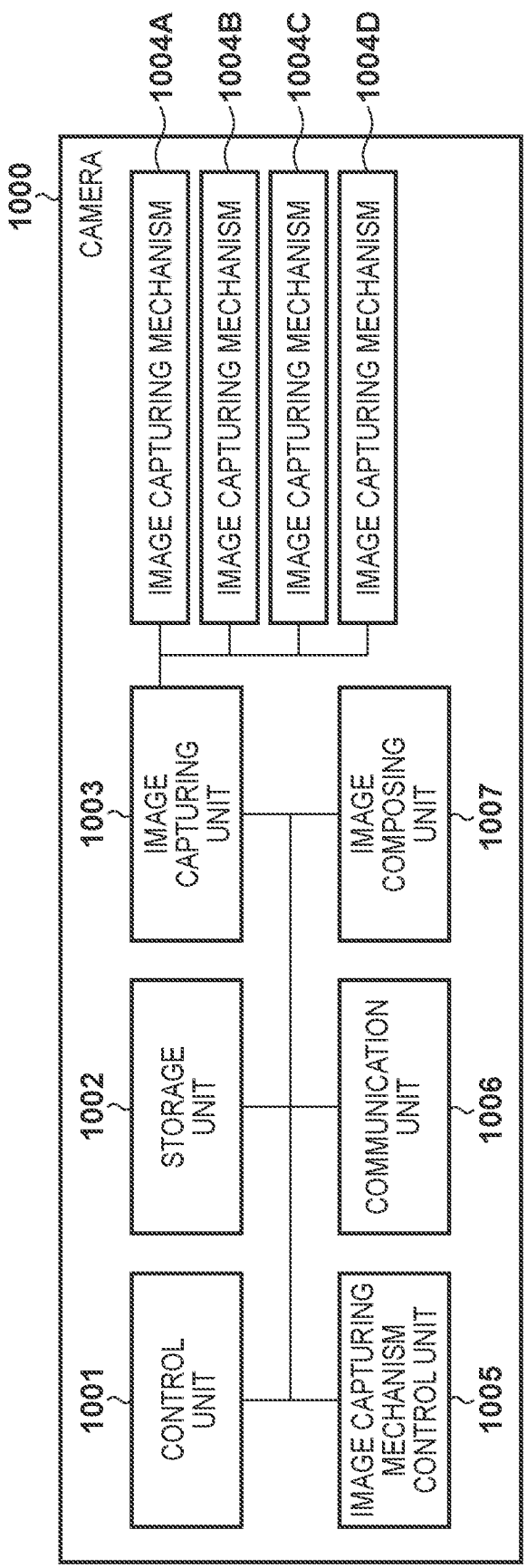
FIG. 2 is a block diagram illustrating an internal configuration of a camera.

FIG. 2 is a block diagram illustrating an internal configuration of the camera 1000. A control unit 1001 performs overall control on the camera 1000. The control unit 1001 may be implemented by, for example, a CPU executing various programs.

A storage unit 1002 stores the programs executed by the control unit 1001, and is also used as a work area for the programs being executed. The storage unit 1002 is also used as a storage area for various types of data. For example, setting values related to the video setting and encoding information related to image capturing mechanisms 1004A to 1004D (hereinafter referred to as an image capturing mechanism 1004), and to image data obtained by composing in an image composing unit 1007 are stored. Furthermore, image data generated by an image capturing unit 1003, and the image data obtained by the composing in the image composing unit 1007 are stored.

The image capturing unit 1003 converts an analog signal of an object image obtained by the image capturing mechanism 1004 into a captured image that is digital data. Then, the captured image thus obtained is output to the storage unit 1002 or the image composing unit 1007.

The image capturing mechanism 1004 includes an imaging optical system including a lens, an image sensor, and the like; and a pan, tilt, and zoom mechanism that controls the imaging direction and the angle of view. An image capturing mechanism control unit 1005 controls the pan, tilt, and zoom mechanism of the image capturing mechanism 1004. After the pan, tilt, and zoom mechanism is controlled, values indicating the position, range, and the like related to an imaging region that has been changed by the control are output to the storage unit 1002.

A communication unit 1006 receives each setting value change and control command from the client device 2000 over the network 3000. A response to each command and various types of data, such as image data stored in the storage unit 1002, are transmitted to the client device 2000.

The image composing unit 1007 composes captured images captured by the image capturing mechanisms 1004A to 1004D and obtained by the image capturing unit 1003, based on the setting values stored in the storage unit 1002. The video obtained by the composing is distributed to the client device 2000 via the communication unit 1006.

Note that the processing block configuration illustrated in FIG. 2 is an example, and thus the configuration in FIG. 2 should not be construed in a limiting sense. For example, the configuration may further include an audio input unit and an audio output unit.

Figure 3:
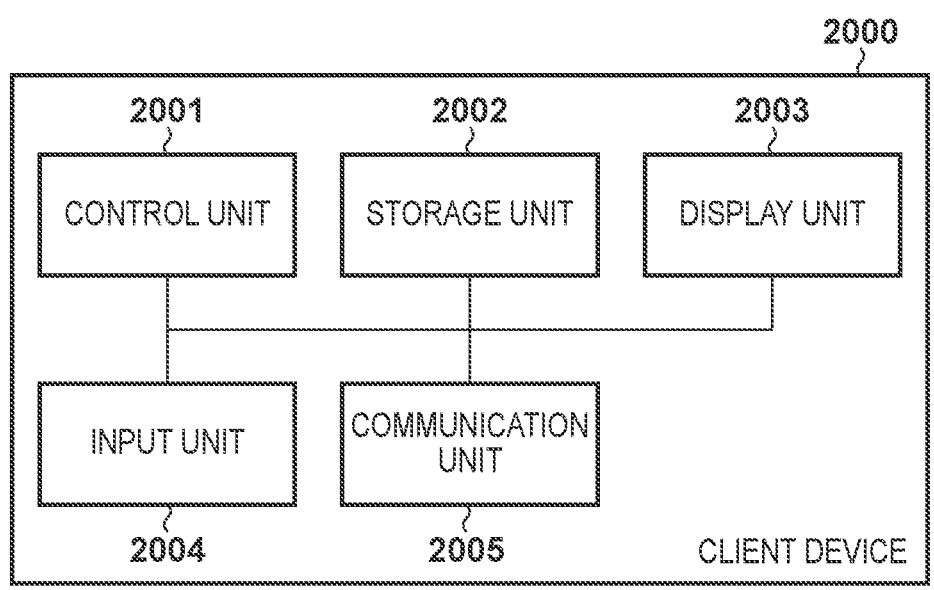
FIG. 3 is a block diagram illustrating an internal configuration of a client device.

FIG. 3 is a block diagram illustrating an internal configuration of the client device 2000. A control unit 2001 performs overall control on the client device 2000. The control unit 2001 may be implemented by, for example, a CPU executing various programs.

A storage unit 2002 stores the programs executed by the control unit 2001, and is also used as a work area for the programs being executed. The storage unit 2002 is also used as a storage area for various types of data. For example, information and the like about a connectable camera on the network 3000 are stored.

A display unit 2003 includes an LCD display and the like for example, and provides, to a user of the client device 2000, various types of information such as a setting screen, a data acquisition/display screen, and various messages.

An input unit 2004 includes, for example, a button, a touch panel, a mouse, and the like, and receives an operation from a user and notifies the control unit 2001 of the received content.

A communication unit 2005 transmits, to the camera 1000 over the network 3000, each change command including that for changing the imaging region. Furthermore, a response to each change command is received from the camera 1000.

Note that the processing block configuration illustrated in FIG. 3 is an example, and thus the configuration in FIG. 3 should not be construed in a limiting sense. For example, the configuration may further include a received video display unit, an image analysis processing unit, and a video accumulation unit.

Operation of Each System Device

Figure 4:
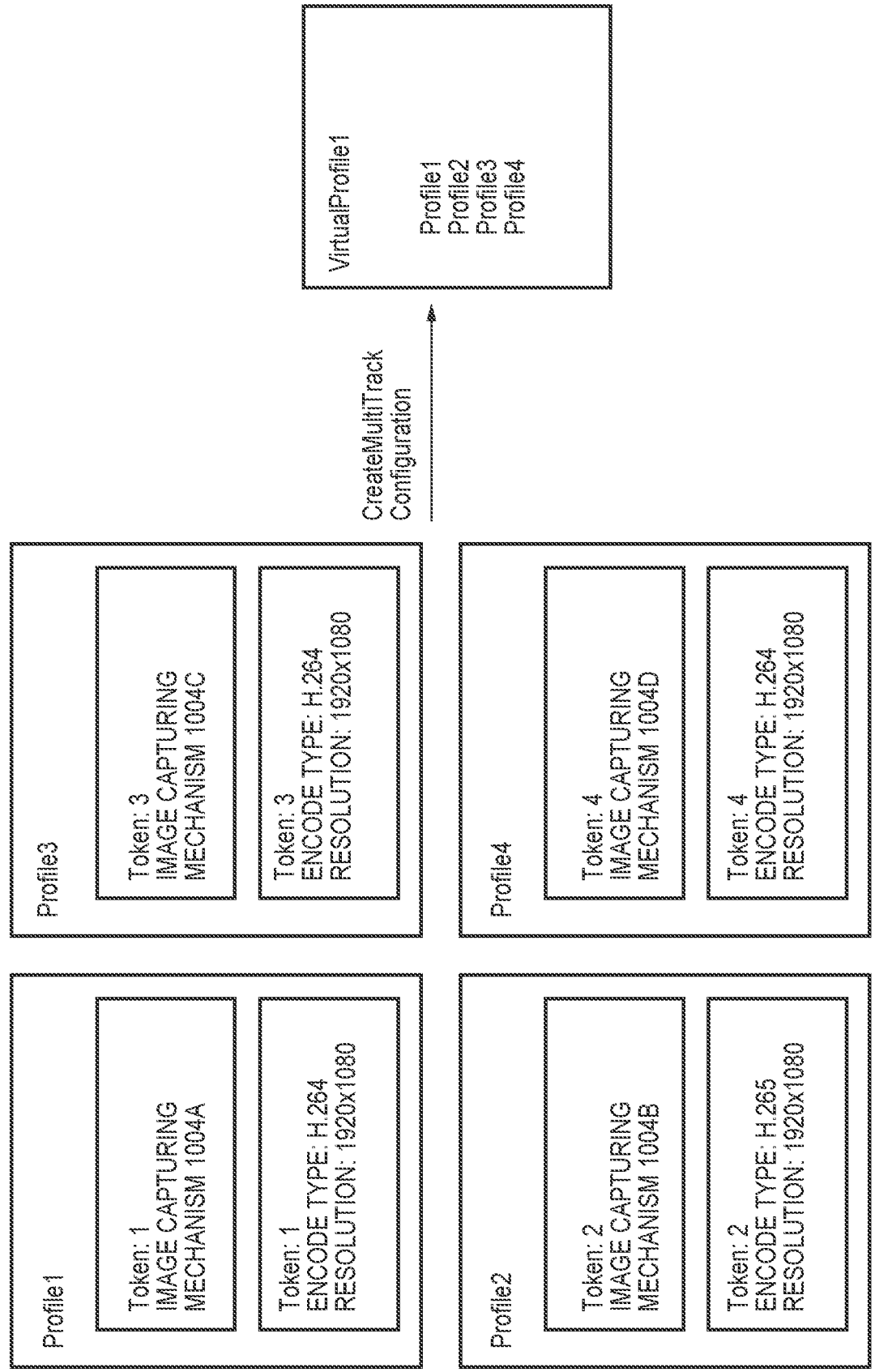
FIG. 4 is a diagram illustrating an example of virtual profile generation.

FIG. 4 is a diagram illustrating an example of virtual profile generation. More specifically, the storage unit 1002 of the camera 1000 stores a profile corresponding to the distribution setting of each of the image capturing mechanisms 1004A to 1004D (video setting and setting for encoding information and the like). The client device 2000 designates two or more profiles, and transmits a CreateMultiTrackConfiguration command to the camera 1000. The CreateMultiTrackConfiguration command is a command requesting for the generation of the virtual profile defined by ONVIF. The control unit 1001 of the camera 1000 integrates the profiles designated in the CreateMultiTrackConfiguration command to generate a single virtual profile.

Note that FIG. 4 illustrates an example where all four profiles corresponding to the four image capturing mechanisms 1004A to 1004D are designated for generating a single virtual profile. It should be noted that a single virtual profile may be generated with another number of (two or three for example) profiles designated.

Figure 5:
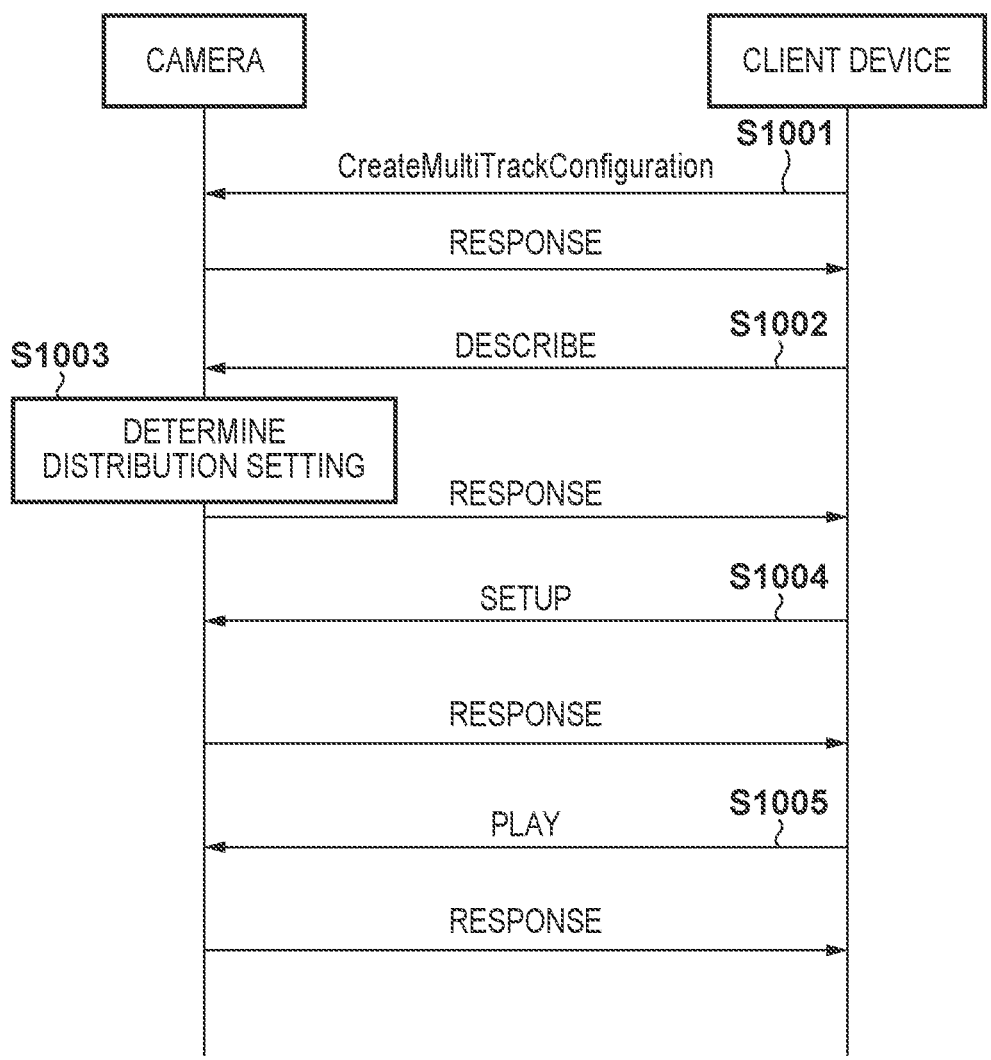
FIG. 5 is a sequence diagram related to virtual profile generation and video distribution processing.

FIG. 5 is a sequence diagram related to virtual profile generation and video distribution processing. Specifically, a data transaction between the camera 1000 and the client device 2000 at the time when the video distribution starts is illustrated.

In S1001, the client device 2000 transmits the CreateMultiTrackConfiguration command to the camera 1000. As described above, the client device 2000 transmits a CreateMultiTrackConfiguration command designating two or more profiles, among a plurality of profiles stored in the camera, to be collectively distributed as a single stream.

The camera 1000 generates a virtual profile including the profiles designated by the CreateMultiTrackConfiguration command. Then, a Token, which is an identifier indicating the virtual profile, is transmitted to the client device 2000 as a response to the command.

In S1002, the client device 2000 transmits a DESCRIBE method, defined by Real Time Streaming Protocol (RTSP), to the camera 1000. The DESCRIBE method is a method of obtaining information about video/sound distributed by cameras. More specifically, the client device 2000 transmits the DESCRIBE method designating a Uniform Resource Identifier (URI) associated with the virtual profile.

In S1003, the camera 1000 determines the distribution setting upon receiving the DESCRIBE method. The camera 1000 determines the virtual profile used for the distribution from the URI included in the DESCRIBE method. Then, the distribution setting is determined based on information about each profile included in the virtual profile. For example, video setting (such as the resolution and frame rate of the distributed video) and encoding information (such as an encoding scheme, tier, and level) are determined. The determined setting is then transmitted to the client device 2000 as a response to the DESCRIBE method.

In S1004, the client device 2000 transmits an RTSP SETUP method to the camera 1000. The SETUP method is a method of requesting for establishing a Real-time Transport Protocol (RTP) session for distribution. More specifically, the client device 2000 transmits, to the camera 1000, a URI provided with information about a stream for which the session is to be established, based on the information obtained in S1003.

Upon receiving the SETUP method, the camera 1000 establishes the session for multicast distribution, and transmits information about the session to the client device 2000.

In S1005, the client device 2000 transmits an RTSP PLAY method to the camera 1000. The PLAY method is a method of requesting the camera for the start of the video distribution.

Upon receiving the PLAY method, based on the setting determined in S1003, the camera 1000 composes the videos associated with the respective profiles into a single video, and starts the distribution to the client device 2000.

Figure 6:
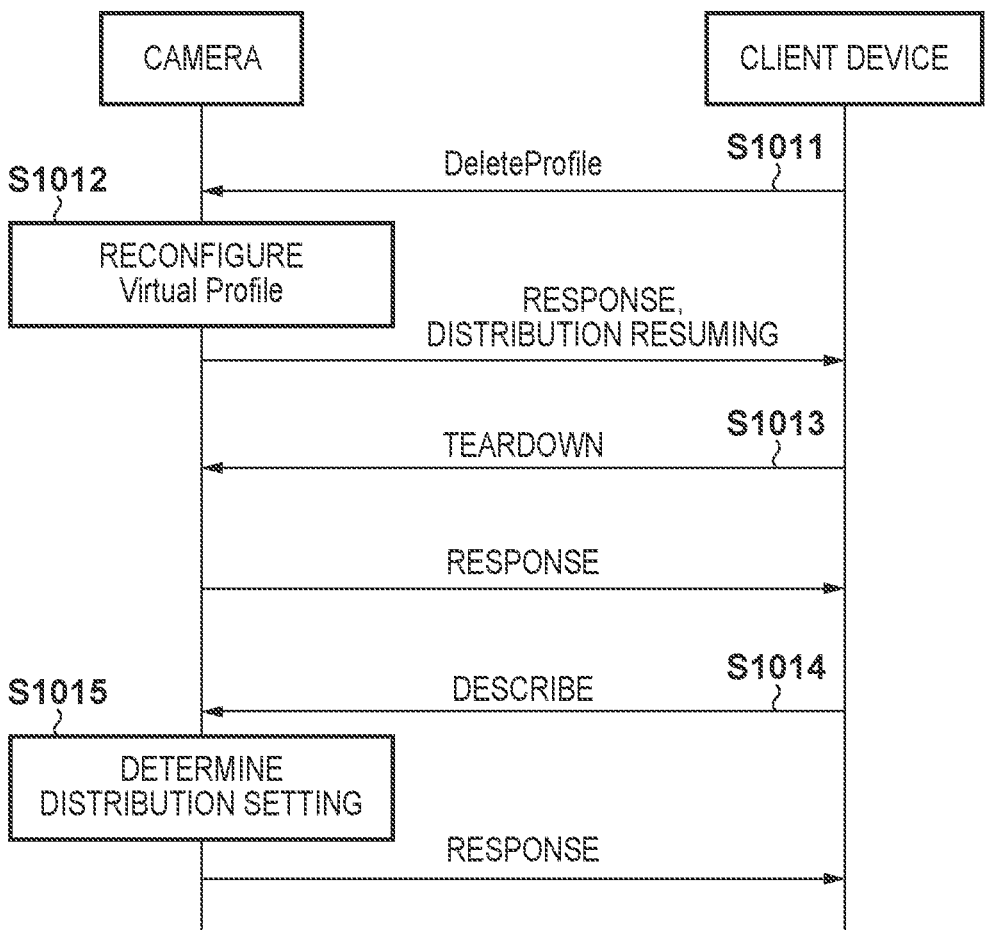
FIG. 6 is a sequence diagram related to virtual profile update processing of the first embodiment.

FIG. 6 is a sequence diagram related to virtual profile update processing of the first embodiment. Specifically, illustrated is a data transaction between the camera 1000 and the client device 2000 in a situation where the virtual profile is changed to invalid (unavailable) due to a profile deletion request from the client device 2000.

In S1011, the client device 2000 transmits a DeleteProfile command to the camera 1000. The DeleteProfile command is a command requesting the camera for deletion of a profile. Thus, the client device 2000 can request for the deletion of the profile included in the virtual profile.

The camera 1000 deletes the designated profile upon receiving the DeleteProfile command. When the profile included in the virtual profile is deleted (or the setting is changed), the configuration of the virtual profile may become invalid.

In S1012, the camera 1000 reconfigures the virtual profile which became invalid. Specifically, in response to the deletion of the profile (or the setting change) in S1011, the video setting and encoding setting used for the distribution are determined, to update the configuration to be valid. It should be noted that the encoding setting (such as an encoding scheme, level, and tier) is maintained unchanged from the setting before the reconfiguration. This is to prevent reproduction (decoding) failure in the client device 2000. After the setting has been determined again, a response to the command is transmitted to the client device 2000, and the video distribution resumes with the updated setting.

Example encoding setting is considered with which distribution is performed using a virtual profile in which H.264 and H.265 are mixed. When the profile H.265 is deleted during the distribution, the virtual profile is generated (reconfigured) with only the video setting changed, and with the encoding setting maintained (that is, the setting of the H.265 remains unchanged). An example of a change in the video setting includes a change of a video corresponding to the deleted profile into a blank image (for example, a black solid image).

In S1013, the client device 2000 transmits an RTSP TEARDOWN method to the camera 1000. The TEARDOWN method is a method of requesting for stopping of video/sound distribution. Specifically, the client device 2000 transmits a TEARDOWN method designating a session to be stopped. Upon receiving the TEARDOWN method, the camera 1000 stops the distribution of the video/sound.

In S1014, the client device 2000 transmits an RTSP DESCRIBE method to the camera 1000.

In S1015, the camera 1000 determines the distribution setting upon receiving the DESCRIBE method. Specifically, upon receiving the TEARDOWN and the DESCRIBE method after the distribution has resumed, the camera 1000 newly determines the distribution setting. In S1012, the distribution setting is determined with the encoding setting maintained, whereas in S1015, the encoding setting is also changed if required.

Examples of a case where the setting needs to be changed include a case where an encoding scheme is to be changed in accordance with a combination between the encoding schemes of the profiles included in the virtual profile. Furthermore, there may be a case such as the information on the level and tier is to be changed due to a change in the resolution, frame rate, video bit rate and the like.

Example encoding setting is considered with which distribution was performed using a virtual profile in which H.264 and H.265 were mixed, but the H.265 profile has been currently deleted. In this case, a virtual profile is regenerated (reconfigured) with the encoding setting changed to H.264 and the video setting changed if required.

The camera 1000 transmits the changed setting to the client device 2000 as a response to the DESCRIBE method. Then, the camera 1000 distributes a video in response to a request (for example, reception of the PLAY method) from the client device 2000.

According to the first embodiment described above, the virtual profile is reconfigured with a state in which the encoding setting of each profile is maintained, when the deletion or setting change is performed on a profile included in the virtual profile during the video distribution. Thus, the distribution can resume with a format receivable by the client device.

When a request for starting distribution is received again after a request for stopping distribution has been received from the client device, the distribution setting including the encoding setting is determined again. Thus, the distribution can be implemented under the setting optimum for the request from the client device.

Second Embodiment

In a second embodiment, a mode is described in which a camera including a plurality of image capturing mechanisms distributes a video to a plurality of client devices.

Configuration of Each System Device

Figure 7:
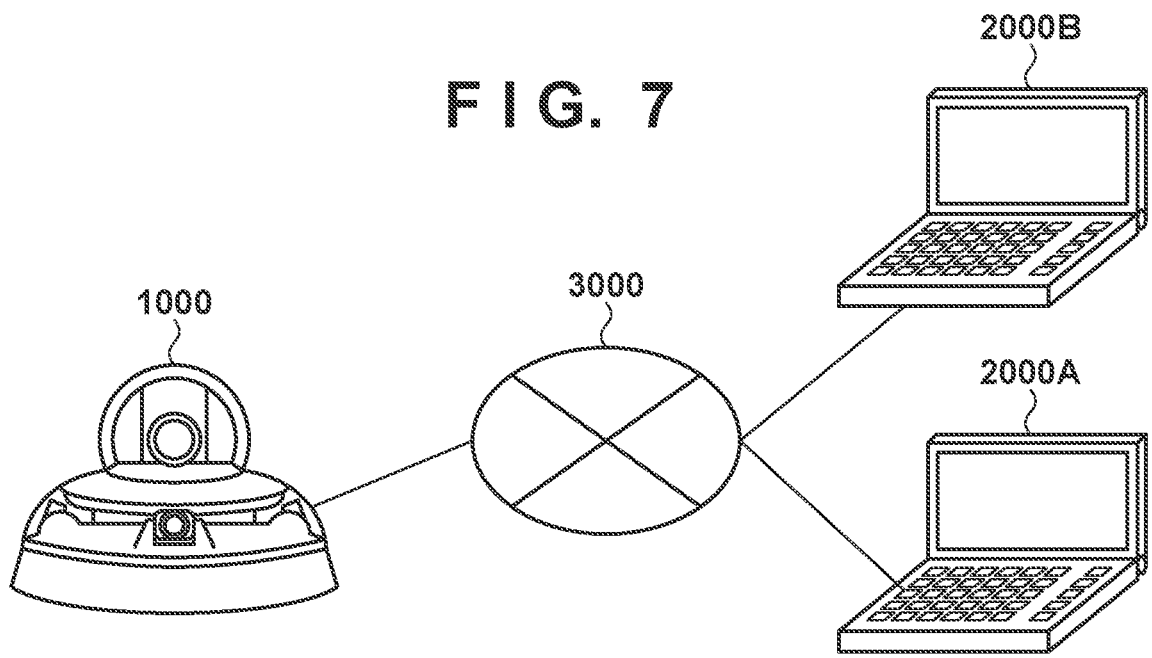
FIG. 7 is a diagram illustrating a system configuration of a second embodiment.

FIG. 7 is a diagram illustrating a system configuration of the second embodiment. The system includes the camera 1000 and client devices 2000A and 2000B (hereinafter referred to as the client device 2000) communicatively connected to each other over the network 3000. The camera 1000 includes a plurality of image capturing mechanisms. The client device 2000 transmits, to the camera 1000, a command requesting for a change in video setting and encoding information related to each image capturing mechanism, and a command requesting for video distribution. The camera 1000 processes the received command, and transmits a response to the corresponding client device 2000.

The internal configurations of the camera 1000 and the client device 2000 are the same as those in the first embodiment (FIG. 1 and FIG. 2), and thus the description thereof will be omitted.

Operation of Each System Device

The generation of the virtual profile and the processing of the video distribution are also same as those in the first embodiment (FIG. 3 and FIG. 4), and thus the description thereof will be omitted.

Figure 8:
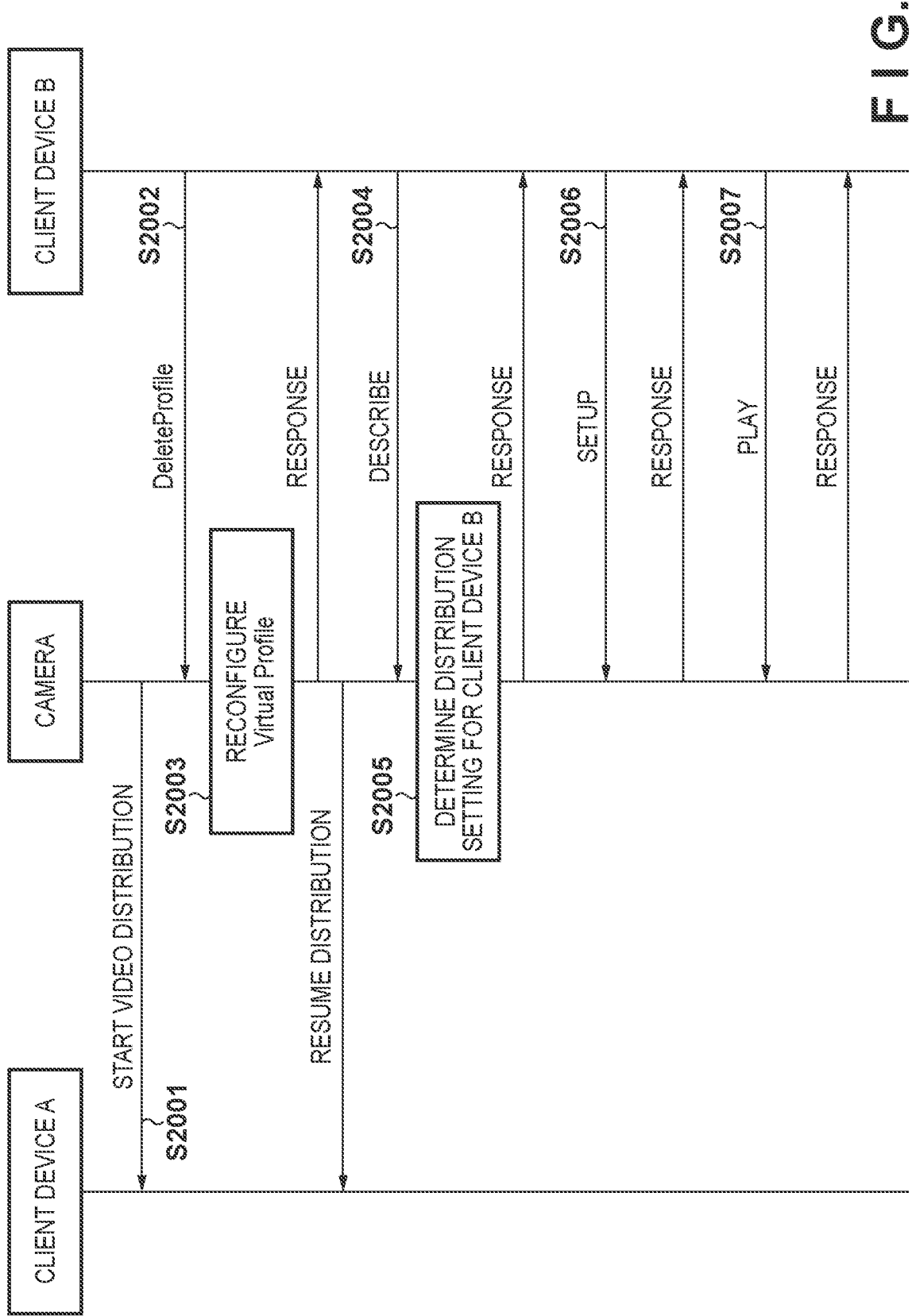
FIG. 8 is a sequence diagram related to virtual profile update processing of the second embodiment.

FIG. 8 is a sequence diagram related to virtual profile update processing of the second embodiment. Specifically, illustrated is a data transaction between the camera 1000 and the client devices 2000A and 2000B in a situation where the virtual profile becomes invalid due to the profile deletion request from the client device 2000B while a video is being distributed to the client device 2000A.

In S2001, the camera 1000 starts distributing a video to the client device 2000A. Specifically, the virtual profile generated in S1001 is designated, and the camera 1000 starts distributing a video to the client device 2000A in response to the video distribution request in S1002 to S1005.

In S2002, the client device 2000B transmits a DeleteProfile command to the camera 1000. The DeleteProfile command is a command requesting the camera for deletion of a profile. Thus, as in the first embodiment, the client device 2000B can request for the deletion of the profile included in the virtual profile.

The camera 1000 deletes the designated profile upon receiving the DeleteProfile command. When the profile included in the virtual profile is deleted (or the setting is changed), the configuration of the virtual profile may become invalid.

In S2003, the camera 1000 reconfigures the virtual profile which became invalid. Specifically, in response to the deletion of the profile (or the setting change) in S2002, the video setting and encoding setting used for the distribution are determined again. It should be noted that the encoding setting (such as an encoding scheme, level, and tier) is maintained unchanged from the setting before the reconfiguration. After the setting has been determined again, a response to the command is transmitted to the client device 2000B, and the video distribution to the client device 2000A resumes with the updated setting.

In S2004, the client device 2000B transmits an RTSP DESCRIBE method to the camera 1000. The DESCRIBE method is a method of obtaining information about video/sound distributed by cameras. Here, the client device 2000B transmits the DESCRIBE method designating a URI associated with the virtual profile.

In S2005, the camera 1000 determines the distribution setting upon receiving the DESCRIBE method. Specifically, upon receiving the DESCRIBE method from the client device 2000B that is a new distribution target, the camera 1000 newly determines the distribution setting. In S2003, the distribution setting is determined with the encoding setting maintained, whereas in S2005, the encoding setting is also changed if required.

Examples of a case where the setting needs to be changed include a case where an encoding scheme is to be changed in accordance with a combination between the encoding schemes of the profiles included in the virtual profile. Furthermore, there may be a case such as the information on the level and tier is to be changed due to a change in the resolution, frame rate, video bit rate and the like.

The camera 1000 transmits the changed setting to the client device 2000B as a response to the DESCRIBE method.

In S2006, the client device 2000B transmits an RTSP SETUP method to the camera 1000. The SETUP method is a method of requesting for establishing the RTP session for the distribution. More specifically, the client device 2000B transmits, to the camera 1000, a URI provided with information about a stream for which the session is to be established, based on the information obtained in S2004.

Upon receiving the SETUP method, the camera 1000 establishes the session for multicast distribution, and transmits information about the session to the client device 2000B.

In S2007, the client device 2000B transmits an RTSP PLAY method to the camera 1000. The PLAY method is a method of requesting the camera for the start of the video distribution.

Upon receiving the PLAY method, based on the setting determined in S2005, the camera 1000 composes the videos associated with the respective profiles into a single video, and starts the distribution to the client device 2000B. Specifically, the distribution starts with a stream that is generated based on the new virtual profile determined in S2005, separately from the stream being distributed to the client device 2000A based on the virtual profile reconfigured in S2003.

Figure 9:
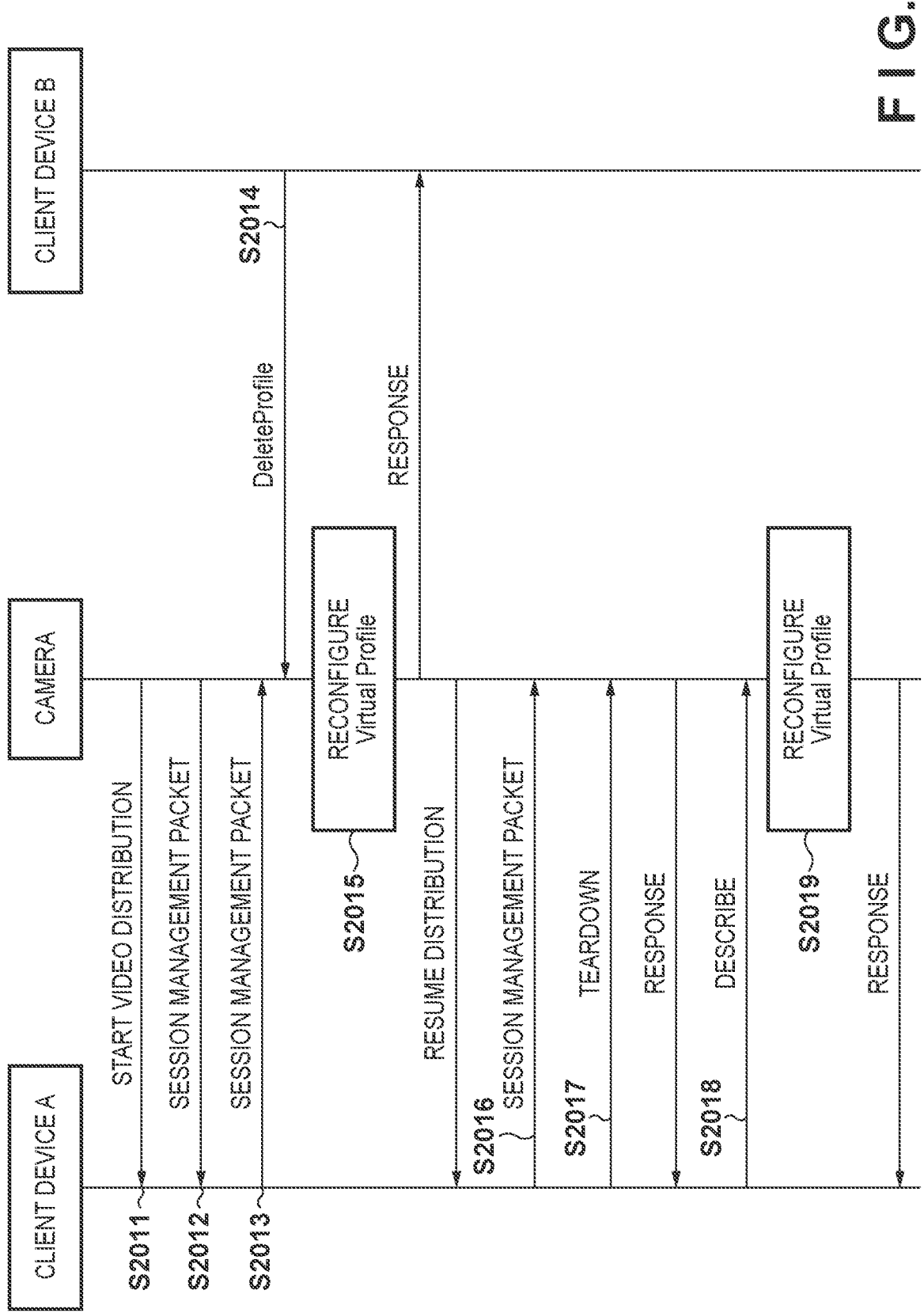
FIG. 9 is a sequence diagram related to session management processing of the second embodiment.

FIG. 9 is a sequence diagram related to session management processing of the second embodiment. The session management processing is processing performed, during the video distribution, to check whether a session is continuing. Here, the camera 1000 and the client device 2000A check whether a session is continuing by periodically repeating transmission and reception of a session management packet therebetween.

In S2011, the camera 1000 starts distributing a video to the client device 2000A. The description will be omitted since this process is the same as that in S2001.

In S2012, the camera 1000 transmits the session management packet to the client device 2000A. Examples of the session management packet transmitted from the camera 1000 to the client device 2000A include an RTCP Sender-Report and the like.

In S2013, the client device 2000A transmits the session management packet to the camera 1000. Examples of the session management packet transmitted to the camera 1000 from the client device 2000A include an RTCP Receiver-Report and the like.

In S2014, the client device 2000B transmits a DeleteProfile command. The description will be omitted since this process is the same as that in S2002.

In S2015, the camera 1000 reconfigures the virtual profile which became invalid. The description will be omitted since this process is the same as that in S2003. As described above, after the setting has been determined again (that is, reconfigured), a response to the command is transmitted to the client device 2000B, and the video distribution to the client device 2000A resumes with the updated setting. After this, the transmission of the session management packet for the client device 2000A is stopped from the camera 1000.

In S2016, the client device 2000A transmits the session management packet to the camera 1000. Thus, the client device 2000A periodically transmits the session management packet even after the video distribution has resumed. Here, the client device 2000A determines that the session has been discontinued, because no session management packet is received from the camera 1000. Thus, the client device 2000A transmits the TEARDOWN method (S2017) and the DESCRIBE method (S2018).

In S2019, the camera 1000 determines the distribution setting upon receiving the DESCRIBE method designating the virtual profile that is the same as that used in the previous distribution from the client device 2000A. Specifically, as in S1015 in the first embodiment, upon receiving the TEARDOWN and the DESCRIBE method after the distribution has resumed, the camera 1000 newly determines the distribution setting. In S2019, the encoding setting is also changed if necessary.

The camera 1000 transmits the changed setting to the client device 2000A as a response to the DESCRIBE method. Then, the camera 1000 distributes a video in response to a request (for example, reception of the PLAY method) from the client device 2000A.

While the camera 1000 stops transmitting the session management packet after S2015 in the above description, a configuration may be employed such as that in which generation of a plurality of streams and distribution continue with a single virtual profile without stopping the distribution.

In the second embodiment as described above, when a virtual profile becomes invalid while a video is being distributed to one client device due to an operation by another client device, the virtual profile is reconfigured in a state in which the encoding setting of each profile is maintained. Thus, the distribution can resume with a format receivable by the client device.

When a request for starting distribution using the same virtual profile is received from the other client device, the distribution setting including the encoding setting is newly determined for the other client device. On the other hand, for the distribution based on the virtual profile with a state of the encoding setting being maintained, the transmission of the session management packet stops. Thus, the distribution to each client device can be implemented under more preferable setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-033728, filed Mar. 3, 2021 which is hereby incorporated by reference herein in its entirety.

What is claimed is:

1. A control apparatus comprising a computer executing instructions that, when executed by the computer, cause the computer to:
store a plurality of profiles corresponding to a distribution setting for each of a plurality of image capturing units;
integrate the plurality of profiles and generate a virtual profile; and
distribute a plurality of videos as a single stream, based on the virtual profile, the plurality of videos being obtained from the plurality of image capturing units,
wherein when the virtual profile becomes an invalid configuration during distribution of the stream, the instructions further cause the computer to update the virtual profile to a valid configuration while maintaining an encoding setting included in the plurality of profiles, and to continue the distribution of the stream based on the updated virtual profile.

2. The control apparatus according to claim 1, wherein a change of the virtual profile to the invalid configuration is due to a deletion or change of one or more profiles included in the plurality of profiles included in the virtual profile.

3. The control apparatus according to claim 2, wherein after updating the virtual profile, upon receiving a request from a first terminal for stopping the distribution of the stream and receiving a request from the first terminal for starting the distribution, the first terminal being a distribution target of the stream, the instructions further cause the computer to integrate a plurality of profiles after a deletion or change of the one or more profiles and regenerate the virtual profile.

4. The control apparatus according to claim 2, wherein after updating the virtual profile, upon receiving a request from a second terminal for starting the distribution of the stream, the second terminal being not a distribution target of the stream by the distribution unit, the instructions further cause the computer to integrate a plurality of profiles after a deletion or change of the one or more profiles and to regenerate the virtual profile.

5. The control apparatus according to claim 1, wherein the encoding setting includes at least one of an encoding scheme, tier, and level.

6. The control apparatus according to claim 1, wherein the plurality of profiles further include a video setting including at least one of a video resolution and frame rate.

7. The control apparatus according to claim 1, wherein the instructions further cause the computer to transmit and receive a session management packet to and from a terminal that is a distribution target of the stream, during the distribution of the stream.

8. The control apparatus according to claim 7, wherein the instructions further cause the computer to stop transmitting the session management packet to the terminal that is a distribution target of the stream when the virtual profile is updated during the distribution of the stream.

9. The control apparatus according to claim 1, wherein the virtual profile is a virtual profile generated by a CreateMultiTrackConfiguration command defined by Open Network Video Interface Forum (ONVIF).

10. The control apparatus according to claim 3, wherein the request for stopping the distribution and the request for starting the distribution correspond to a TEARDOWN method and a DESCRIBE method defined by Real Time Streaming Protocol (RTSP).

11. A control method in a distribution device, the control method comprising:
integrating a plurality of profiles corresponding to a distribution setting for each of a plurality of image capturing units and generating a virtual profile;
distributing a plurality of videos as a single stream, based on the virtual profile, the plurality of videos being obtained from the plurality of image capturing units; and
when the virtual profile becomes an invalid configuration during distribution by the distributing, (1) updating the virtual profile to a valid configuration while maintaining an encoding setting included in the plurality of profiles, and (2) continuing the distribution of the stream based on the updated virtual profile.

12. A non-transitory computer-readable recording medium storing a program for causing a computer to execute a control method in a distribution device, the control method comprising:

integrating a plurality of profiles corresponding to a distribution setting for each of a plurality of image capturing units and generating a virtual profile;

distributing a plurality of videos as a single stream, based on the virtual profile, the plurality of videos being obtained from the plurality of image capturing units; and when the virtual profile becomes an invalid configuration during distribution by the distributing, (1) updating the virtual profile to a valid configuration while maintaining an encoding setting included in the plurality of profiles, and (2) continuing the distribution of the stream based on the updated virtual profile.

* * * * *